United States Patent [19]

Funke et al.

[11] Patent Number: 4,676,935
[45] Date of Patent: Jun. 30, 1987

[54] METHOD OF PRODUCING MIXED-OXIDE NUCLEAR FUEL PELLETS SOLUBLE IN NITRIC ACID

[75] Inventors: Peter Funke, Hanau; Dietmar Hanus, Alzenau; Rainer Löb, Obernburg; Wihelm Königs, Rodenbach, all of Fed. Rep. of Germany

[73] Assignee: Alkem GmbH, Hanau, Fed. Rep. of Germany

[21] Appl. No.: 775,701

[22] Filed: Sep. 13, 1985

Related U.S. Application Data

[63] Continuation of Ser. No. 529,664, Sep. 6, 1983, abandoned, which is a continuation of Ser. No. 244,654, Mar. 17, 1981, abandoned.

[30] Foreign Application Priority Data

Mar. 19, 1980 [DE] Fed. Rep. of Germany ....... 3010547

[51] Int. Cl.⁴ .............. G21C 21/00; G21C 19/42; G21C 19/44
[52] U.S. Cl. .................... 264/0.5; 252/627; 252/643
[58] Field of Search ................. 252/643, 627; 264/0.5

[56] References Cited

U.S. PATENT DOCUMENTS

| | | | |
|---|---|---|---|
| 3,087,781 | 4/1963 | Levey et al. | 264/0.5 |
| 3,806,565 | 4/1974 | Langrod | 264/0.5 |
| 4,247,495 | 1/1981 | Ennerst et al. | 252/643 |
| 4,284,593 | 8/1981 | Sutcliffe et al. | 264/0.5 |

FOREIGN PATENT DOCUMENTS 1030465  5/1966  United Kingdom .

OTHER PUBLICATIONS

Gardner, "Uranium Dioxide and Other Ceramic Fuels" in Kaufmann, Ed. *Nuclear Reactor Fuel Elements:Metallurgy and Fabrication,* Interscience Publishers (1962) New York, pp. 200–203.

Sands et al., *Powder Metallurgy:Practice and Applications,* George Newnes Ltd., London (1966), pp. 24–25.

*Primary Examiner*—Richard D. Lovering
*Assistant Examiner*—Virginia B. Caress
*Attorney, Agent, or Firm*—Herbert L. Lerner; Laurence A. Greenberg

[57] ABSTRACT

Production of mixed-oxide nuclear fuel pellets of uranium dioxide ($UO_{2+x}$) and plutonium dioxide ($PuO_2$) which are soluble in nitric acid. The powder mixture of oxides is added to a halogen-free milling aid, such as propane diol, then is milled and subsequently granulated, pressed and sintered. The milling aid is expelled by subsequent drying processes or heat treatments (sintering). The milling process is controlled to obtain a primary grain size of less than two micrometers.

1 Claim, No Drawings

METHOD OF PRODUCING MIXED-OXIDE NUCLEAR FUEL PELLETS SOLUBLE IN NITRIC ACID

This application is a continuation of application Ser. No. 529,664, filed Sept. 6, 1983, now abandoned, which is a continuation of application Ser. No. 244,654, filed Mar. 17, 1981, now abandoned.

BACKGROUND OF THE INVENTION

1. Field of the Invention

The present invention relates to a method for producing mixed-oxide nuclear fuel pellets of uranium dioxide ($UO_{2+x}$) and plutonium dioxide ($PuO_2$) soluble in nitric acid.

2. Background of the Invention

It was known to make fuel pellets by milling the powder mixture with a $PuO_2$-content of up to 50% in mills wihin glove boxes and by subsequent granulating, pressing and sintering. The requirement of solubility of nuclear fuel pellets results from the necessity of reprocessing burned-up nuclear fuels and the recovery, connected therewith, of most valuable raw materials. This requirement in itself is not new: reference is made to German Published Non-Prosecuted Application No. 28 33 054. According to the method proposed there, the formation of the mixed crystals, as a prerequisite for the solubility, is achieved by repeated milling of the radiotoxic material. Apart from the increased radiation exposure, connected therewith, of the operating personnel, which cannot be avoided completely even when working with so-called shielded glove boxes, this method is relatively cumbersome. The dust production in milling or when emptying the mills is also a disadvantage, since the dust deposits in the closed-off glove boxes on all surfaces and thus must be removed again by decontamination.

SUMMARY OF THE INVENTION

An object of the present invention is to provide a method for producing mixed-oxide nuclear fuels which are soluble in nitric acid, which method is substantially simpler and with which the disadvantages connected with the dust accumulation and deposition can be avoided to a very large extent.

With the foregoing and other objects in view, there is provided in accordance with the invention, a method for producing mixedoxide fuel pellets of uranium dioxide and plutonium dioxide by milling a powder mixture of uranium dioxide with up to 50% by weight plutonium dioxide and by subsequent granulation, pressing and sintering, the improvement comprising increasing the solubility of the plutonium component in the pellet in nitric acid by effecting the milling of the powder mixture in the presence of a halogenfree milling aid which can be expelled from the mixture by heating to a temperature up to said sintering, and wherein milling is conducted to produce a primary grain size of less than 2 micrometers, and wherein the mixture is heated to expel the milling aid.

Other features which are considered as characteristic for the invention are set forth in the appended claims.

Although the invention is illustrated and described herein as embodied in a method for producing mixed-oxide nuclear fuel pellets soluble in nitric acid, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

According to the invention, there is added to the starting materials, prior to the milling, halogen-free milling aids which can be expelled by subsequent drying processes or heat treatments (sintering). Also the milling operation is controlled to obtain a primary grain size of under 2 $\mu$m.

With such a milling aid, the required fine grain size can be achieved in one operation, so that the formation of dust and thereby, the above-described annoyances can be reduced to a large degree. The materials must be chosen so that no undesirable residual materials remain in the nuclear fuel pellets; this relates particularly to fluorine. For the development of the mixed crystals, which are soluble in nitric acid, a primary grain size of the uranium dioxide and plutonium dioxide powders of less than 2 $\mu$m is required. This is set by process parameters such as milling time, degree of filling of the mills as well as the type of mill.

In this manner, any desired mixing ratios Pu/U can be adjusted. The further processing into nuclear fuel pellets takes place in the customary manner by pressing, granulating and sintering at about 1700° C.

A further advantage is to first prepare a powder mixture with a plutonium content higher than normally required and to store it and to keep at the same time a supply of uranium dioxide powder in readiness. By appropriately mixing the two kinds of powder, mixedoxide nuclear fuels with the desired plutonium content can then be prepared on short notice. Since the startng powders are mixed with each other, the desired homogeneous distribution of plutonium in the nuclear fuel is achieved in this manner.

This new method can be carried out, largely avoiding the formation of dust under plutonium glove box conditions. The mills need not necessarily be cleaned if the plutonium or fission material content of the powder mixture is changed. The exact adjustment of the plutonium or uranium content need be made only shortly before the nuclear fuel pellets are pressed. The milling aid used also takes care that the material to be milled does not stick to the walls of the milling vessel or the balls. This facilitates the removal of the milled material from the milling vessels and the cleaning of same. It is also very important here that by means of these milling aids, very high grain fineness can be achieved, which is necessary in view of the development of the desired mixed crystals, the solubility of which in nitric acid is of decisive importance.

Proven milling aids are organic substances with tenside-like behavior such as polyalcohols or amines. Also water could be used. In that case, it should be noted, however, that due to the moderating properties, the danger that the powder mixture might become critical, must be taken into consideration. This means that the amount of powder must be limited accordingly and also that the vessels and mills must have a volume which precludes the possibility of the occurrence of a critical configuration from the start.

To explain this method in further detail, three embodiment examples will now be described:

EXAMPLE 1

$UO_2$-powder and $PuO_2$-powder are weighed in the ratio of 4:1 and in an amount of 500 g into a mill. To the powder mixture are added 200 g water, which corresponds to a water content of approximately 30%; this amount of water, however, presents a problem in view of the criticality problems with the fission materials uranium 235 and plutonium. Only if the total amount of fissionable material is kept very small, as in this example, or if a criticality-proof geometry (for instance, the diameter of the mill) is observed, will no difficulties be expected. The quantity of powder is milled in the mill for 12 hours. After the milling, the milled material is dried in a drying cabinet or in a vacuum. Subsequently, the material is granulated and the powders are pressed into pellets, and sintered at 1700° C. in inert gas/hydrogen mixtures.

The following table shows some characteristic data of such powder mixtures.

| | Powder Data | Pellet Data | |
|---|---|---|---|
| | Compacted Apparent Density g/cm$^3$ | Sintered Density g/cm$^3$ | Solubility of the Pu-Component in HNO$_3$, % |
| Powder mixture, unmilled | 3.0 | 10.3 | 67.3 |
| Powder mixture, milled with the addition of water | 2.9 | 10.5 | 99.6 |

EXAMPLE 2

$UO_2$-powder and $PuO_2$-powder are weighed into a mill in the ratio of 7:3 (parts by weight) and a total quantity of 500 g. To the powder mixture are added 0.5 g of a polyalcohol, propane diol, which corresponds to a content by weight of 0.1%.

With respect to the criticality problems discussed in Example 1 with the fissionable materials uranium 235 and plutonium, no problems are expected in this case, since the ratio of the number of the hydrogen atoms to the number of the fissionable atoms is far below the critical value of 1. Therefore, no limitation as to the geometric data of the mill need be provided in this case.

The powder mixture is milled together with the organic milling aid for 12 hours. The milled powder is granulated, pressed into pellets and sintered at 1700° C. in inert gas/hydrogen mixtures.

The following table shows characteristic data of the $UO_2/PuO_2$ mixture so processed.

| | Pellet Data | |
|---|---|---|
| Powder Data Compacted Apparent Density in g/cm$^3$ | Sintered Density g/cm$^3$ | Solubility of the Pu-Component in HNO$_3$ % |
| 3.7 | 10.5 | 99.9 |

EXAMPLE 3

A powder mixture of $UO_2$ and $PuO_2$ with a 30-% plutonium content is placed, as described in Example 2, in a mill; 0.1% of the organic milling aid is added and milling proceeds for 12 hours. Subsequently, the mill is emptied, the powder is examined for its plutonium content and then taken to interim storage. After interim storage, a nuclear fuel for light-wear reactors with a plutonium content of 3% is to be manufactured with the powder. To this end, the calculated amount of the plutonium-containing milled powder is taken from storage and mixed with the calculated amount of $UO_2$-powder in an intensive mixer.

The powder mixture obtained is tested for homogeneous distribution of the plutonium and the predetermined plutonium content. If these data are in the predetermined range, the powder mixture is granulated (by either dry or wet processes), pressed into pellets of the desired shape and sintered, for instance, at 1700° C. The distribution of the plutonium in such pellets is, depending on the intensity of the mixing process, sufficiently homogeneous and corresponds in a substantially better manner to the reactorphysical requirements than would be the case if the same cycle would be run with more coarse-grained granulate instead of with the fine-grain powders. The solubility of such pellets in nitric acid corresponds to that which was also found in Example 2.

These examples show that it is possible by means of this simple method to achieve the desired solubility of mixed-oxide nuclear fuels in nitric acid.

It is advantageous to granulate the milled powder mixture as a piled bed in a rotating vessel by build-up granulation.

Suitable rotating vessels are, for example, the vessels shown in FIG. 1 on page 149 of "Zeitschrift Fuer Werkstofftechnik/Journal of Materials Technology" volume 4, No. 3 (1973), i.e., for instance, hollow granulating cylinders or granulating dishes which execute a rotary motion with a horizontal, inclined, tumbling or gyrotary axis of rotation and which can be operated within a glove box. Since the form of the granulating vessel was found not to be important, differently shaped vessels, i.e. for instance, hollow spheres or conical vessels can also be used for granulating.

If such granulating vessels are used, which are advantageously closed off during the granulating, the development of dust is small as compared with the dust development which would occur with the customary granulating by pre-compacting the powder in a press and subsequent breaking-up of the pressed material, and which can lead over an extended period of time to considerable radiation exposure in the glove boxes.

After a period of granulating of about 120 minutes in a rotating granulating vessel, there is produced from the milled and optionally dried powder mixture a highly flowable, homogeneous, well processable and sinterable build-up granulate. To facilitate the formation of this granulate, fine agglomeration seeds which consist of sintered uranium-plutonium mixed oxide, can be added to the milled powder mixture (material to be milled) prior to the granulating. These seeds can be made of reprocessed powder which comes from previous productions of mixed oxide nuclear fuel pellets. The addition of a binder to the milled powder mixture prior to granulating is not necessary.

The speed of rotation of the granulating vessel may be 10 to 70% of the critical speed of rotation, at which the powder charge begins to cling to the inside wall of the rotating granulating vessel. The degree of fillng of the granulating vessel is less than, or at most equal to, 80% of the volume of the granulating vessel.

Starting with optionally admixed agglomeration seeds, spherical granulates with an average diameter of less than 300 micrometers can be produced in this manner. The maximum diameter of the granulates is approximately 1 mm. The finest component of the granulate, which has a tendency to form dust, is considerably less than in granulates which are produced by compacting and subsequent breaking-up. Granulates of the last-mentioned type of production have a broad grain spectrum with a high very-fine grain component tending to produce dust.

The build-up granulate produced by the method according to the invention can be compressed in a press without pressing aids, for instance, zinc stearate, directly into fuel pellets with predetermined dimensions. These pellets are sintered in conclusion in a reducing atmosphere at about 1700° C., as already mentioned.

Uranium dioxide powder as known in practice often contains oxygen in slight excess of the two atoms of oxygen to one of uranium and the term uranium dioxide in the claims is intended to include them.

We claim:

1. In a method for producing mixed-oxide fuel pellets of uranium dioxide and plutonium dioxide by milling a powder uranium dioxide and plutonium dioxide by milling a powder mixture of uranium dioxide with up to 50% by weight plutonium dioxide and by subsequent granulation, pressing and sintering, the improvement comprosing increasing the solubility of the pellet is nitric acid by effecting the milling of the powder mixture in an unsintered physical mixture of uranium dioxide and plutonium dioxide in the presence of a halogen-free organic milling aid consisting of propane diol which is expelled from the mixture by heating to a temperature up to said sintering, and wherein milling is conducted to produce a primary grain size of less than 2 micrometers and wherein said subsequent sintering is a single sintering operation of the unsintered physical mixture of uranium dioxide and plutonium dioxide.

* * * * *